United States Patent [19]

Basch et al.

[11] 4,184,056
[45] Jan. 15, 1980

[54] FAULT LOCATING SYSTEM FOR OPTICAL TELECOMMUNICATIONS

[75] Inventors: E. Evert Basch, Stow; Richard A. Beaudette, Tewksbury, both of Mass.

[73] Assignee: GTE Laboratories Incorporated, Waltham, Mass.

[21] Appl. No.: 948,850

[22] Filed: Oct. 5, 1978

[51] Int. Cl.$^2$ ............................ H04B 3/46; H04B 9/00
[52] U.S. Cl. ..................... 179/175.3 F; 179/175.31 R; 250/199
[58] Field of Search ............... 179/175.31 R, 175.3 R, 179/170 F, 15 BF; 250/199

[56] References Cited

U.S. PATENT DOCUMENTS

| | | | |
|---|---|---|---|
| 3,652,858 | 3/1972 | Kinsel | 250/199 |
| 3,683,352 | 8/1972 | West et al. | 250/199 |
| 4,090,067 | 5/1978 | Bell et al. | 250/199 |
| 4,112,263 | 9/1978 | Lender | 179/175.31 R |

Primary Examiner—Thomas A. Robinson
Attorney, Agent, or Firm—Fred Fisher; Robert E. Walrath

[57] ABSTRACT

A fault locating system for optical telecommunications includes a central office and means associated therewith for generating a tone signal. Analog to digital conversion means convert the tone signal to a digital signal. Cable driving means, receiving the digital signal, provide a driving output to an optical cable. The optical cable output is coupled to an input of a repeater which reforms the received digital signal before retransmission thereof. The repeater is coupled to an input of a filter which passes signals at a frequency $f_1$. The output of the first repeater is coupled to an input of a second optical cable. The output of the second optical cable is coupled to an input of a second repeater which reforms the received digital signal before retransmission thereof. The second repeater is coupled to an input of a second filter which passes signals at a frequency $f_2$. The output of the $(n-1)$st repeater is coupled to the input of an nth optical cable. The output of the nth optical cable is coupled to an input of an nth repeater which reforms the received digital signal before retransmission thereof. The nth repeater is coupled to an input of an nth filter which passes signals at a frequency $f_n$ ( $n$ is an integer greater than 1). A pair of wires couples the outputs of all the filters to the central office. The analog to digital conversion means can include a delta modulator which can include a comparator having a first input adapted to receive a tone signal. It can further include a quantizer having a first input coupled to the comparator output, a second input adapted to receive clock pulses, a first output for providing a digital output therefrom and a second output coupled to an input of an audio filter whose output is coupled to the comparator second input.

11 Claims, 3 Drawing Figures

FAULT LOCATING SYSTEM FOR OPTICAL TELECOMMUNICATIONS

BACKGROUND OF THE INVENTION

1. Field of the Invention

This invention relates to a fault locating system for optical telecommunications, and in particular relates to a fault locating system for telecommunication repeaters, incorporating optical cable. Accordingly, it is a general object of this invention to provide new and improved methods and apparatus of such character.

2. Description of the Prior Art

In the past, telecommunication signals were transmitted along electrical wire from a central office to a repeater. The repeater would amplify the received signals and transmit them along electrical wire to a second repeater. Again, the second repeater would amplify its received signals and transmit them along electrical wire to a third repeater, and so on to an nth repeater.

To locate a fault which might be present in any one of the repeaters, a separate filter was associated with each repeater, each filter having a unique frequency $f_1$, $f_2$, $f_3$, ... $f_n$ associated therewith. The outputs of all the filters were transmitted along a single pair of wires to the central office. The central office would send a bipolar signal (at a rate substantially higher than $f_1$, $f_2$, $f_3$, ... $f_n$) with several unipolar positive signals and then several unipolar negative signals, alternating at a sinusoidal rate $f_1$ to the first repeater. If no fault was present at the first repeater, the pair of wires would return a signal at the frequency $f_1$. If a fault was present at the first repeater, no signal would be returned.

Following detection of "no fault" at the first repeater by the reception of the frequency $f_1$ at the central office, another set of bipolar signals at the substantial rate together with several unipolar positive signals and then several unipolar negative signals, alternating at a sinusoidal rate $f_2$, would be sent to the first repeater by the central office. The first repeater would amplify the signals and transmit them along electrical wires to the second repeater. The filter $f_2$ associated with the second repeater would pass the tone at the frequency $f_2$ therethrough, along the single pair of wires, back to the central office. The first repeater filter $f_1$ would not pass any signal at the frequency $f_2$ therethrough. Thus, the reception of the frequency $f_2$ back at the central office indicates "no fault" at the second repeater. Conversely, a lack of reception would indicate a fault at the second repeater.

The procedure is repeated at a different rate $f_3$ for the third repeater, etc., to a different rate $f_n$ for the nth repeater.

In general, traditionally, the method for locating a faulty line on a T-carrier has been to use trio patterns (triplets of "1") modulated with several low frequencies, as set forth, for example, by Mayo, J. S. "Bipolar Repeater for PCM Signals," Bell System Technical Journal, January 1962; each repeater location is identified with one of the fault frequencies. The output of the fault winding of a repeater is connected to a fault pair (a wire pair dedicated for fault locating purposes) through a very high Q band pass filter, the center frequency of the filter coinciding with the frequency associated with the repeater. To interrogate a repeater with this scheme, a trio pattern of low density, modulating with the frequency pertaining to the repeater, is transmitted from the central office, and the level of the fault locating tone returned by the repeater over the fault pair is measured at the central office. When the trio density is increased, the returned level should increase also for a good repeater.

The traditional trio pattern method cannot be used in an optical T-1 system since the optical system employs unipolar transmission, and the trio patterns are based on violations of the bipolar pulse pattern employed in the metallic T-1 system.

SUMMARY OF THE INVENTION

Another object of this invention is to provide for new and improved methods and apparatus for detecting and locating faults in telecommunication system employing repeaters and optical cable.

Yet another object of this invention is to provide for new and improved methods and apparatus for locating faults in telecommunication repeaters by encoding low frequency tones with a delta modulator operating at a T-1 or other carrier bit rates and decoding the tones at each repeater location.

Still another object of the invention is to provide for new and improved methods and apparatus for locating faults in telecommunication repeaters by using a square wave of a low frequency to gate a pulse stream operating at the T-1 or other carrier bit rates and decoding the tones at each repeater location.

Still yet another object of this invention is to provide for new and improved methods and apparatus for locating faults in telecommunication systems employing repeaters and optical cable while using low frequency tones generated by the central office for such fault locating and using the wire pair return wires or other fiber lines in the direction of such fault location.

In accordance with a preferred embodiment of the invention, the combination includes a central office and means associated therewith for generating a tone signal. Analog to digital conversion means convert the tone signal to a digital signal. Cable driving means, receiving the digital signal, provide a driving output to an optical cable. The optical cable output is coupled to an input of a repeater which reforms the received digital signal before retransmission thereof. The repeater is coupled to an input of a filter which passes signals at a frequency $f_1$. The output of the first repeater is coupled to an input of a second optical cable. The output of the second optical cable is coupled to an input of a second repeater which reforms the received digital signal before retransmission thereof. The second repeater is coupled to an input of a second filter which passes signals at a frequency $f_2$. The output of the (n−1)st repeater is coupled to the input of an nth optical cable. The output of the nth optical cable is coupled to an input of an nth repeater which reforms the received digital signal before retransmission thereof. The nth repeater is coupled to an input of an nth filter which passes signals at a frequency $f_n$ (n is an integer greater than 1). A pair of wires couples the outputs of all the filters to the central office. In certain versions, the analog to digital conversion means includes a delta modulator which can include a comparator having a first input adapted to receive a tone signal. It can further include a quantizer having a first input coupled to the comparator output, a second input adapted to receive clock pulses, a first output for providing a digital output therefrom and a second output coupled to an input of an audio filter whose output is coupled to the comparator second input.

In accordance with another embodiment of the invention, the combination includes a central office together with means associated therewith for generating a square wave for gating a pulse stream at a T-1 or other carrier bit rate. The generating means are coupled to cable driving means which provide an output for driving an optical cable. The output of the first optical cable is coupled to a first repeater for reforming the received pulse stream before retransmission thereof. The first repeater is coupled to an input of a first filter which is adapted to pass signals at a frequency $f_1$. The output of the first repeater is coupled to the input of a second optical cable. The output of the second optical cable is coupled to the input of a second repeater which reforms the received pulse stream before retransmission thereof. The second repeater is coupled to the input of the second filter which is adapted to pass signals at the frequency $f_2$. The output of the $(n-1)$st repeater is coupled to the input of an nth optical cable which reforms the received pulse stream before retransmission thereof. The nth repeater is coupled to the input of the nth filter which passes signals at the frequency $f_n$ (n is an integer greater than 2). A pair of wires couples the outputs of the filters to the central office.

In accordance with yet another embodiment of the invention, a method of locating a fault in one of n repeaters serially connected by optical cable to the central office, wherein each repeater has a different frequency associated therewith and wherein each repeater has a very high Q band-pass filter having the center frequency thereof coinciding with the frequency associated with the respective repeater, includes, in the order named: (1) delta modulating a tone signal having a frequency $f_1$, corresponding too the frequency associated with the first repeater, at a T-1 or other carrier bit rate, at the central office, (2) converting the delta modulated tone signal to unipolar light output and driving a first optical cable coupling the central office to the first repeater, (3) detecting on a single pair of wires, which couples the outputs of all the filters to the central office, the presence or absence of the frequency $f_1$, (4) delta modulating a tone signal having a frequency $f_2$ corresponding to the frequency associated with the second repeater, at the T-1 or other carrier bit rate, at the central office, (5) converting the delta modulated tone signal to unipolar light output and driving a second optical cable coupling the first repeater to the second repeater, (6) detecting with said single pair of wires, which couples the outputs of all the filters of the central office, the presence or absence of the frequency $f_2$, (7) delta modulating a tone signal having a frequency $f_n$ corresponding to said frequency associated with the nth repeater at the T-1 bit rate, at the central office, (8) converting the delta modulated tone signal to unipolar light output and driving an nth optical cable coupling the central office to the nth repeater, (9) detecting with said single pair of wires which couples the outputs of all the filters to the central office the presence or absence of the frequency $f_n$, wherein the n is an integer greater than 2 and wherein the method ceases following the detection of an absence of one of the frequencies. In accordance with certain versions of the invention, the method can continue through to the nth repeater.

In accordance with yet another embodiment of the invention, a method of locating a fault in one of n repeaters, serially connected by optical cables to a central office, wherein each repeater has a different frequency associated therewith and wherein each repeater has a very high Q band-pass filter having the central frequency thereof coinciding with the frequency associated with respect to the repeater, includes, in the order named: (1) using an audio frequency square wave to gate a pulse stream operating at a T-1 or other carrier bit rate, at the central office, (2) converting the gated stream into unipolar light output for driving a first optical cable coupling said central office to said first repeater, (3) detecting on a single pair of wires that couples the ouputs of all the filters to the central office the presence or absence of said frequency $f_1$, (4) using an audio frequency square wave at the frequency $f_2$ to gate a pulse stream operating at the T-1 bit rate, at the central office (5) converting said gated stream into a unipolar light output for driving a second optical cable coupling said first repeater to said second repeater, (6) detecting on said single pair of wires that couples the outputs of all of the filters to said central office, the presence or absence of said frequency $f_2$, (7) using an audio frequency square wave having a frequency $f_n$ to gate a pulse stream operating at the T-1 or other carrier bit rate, at the central office, and (8) converting said gated stream into unipolar light output for driving an nth optical cable from said nth repeater, and so on, wherein n is an integer greater than 2 and wherein the method ceases following the detection of n absence of one of the frequencies.

BRIEF DESCRIPTION OF THE DRAWINGS

Other objects, advantages and features of this invention will become more apparent from the following description, when read in conjunction with the accompanying drawing, in which.

DESCRIPTION OF A PREFERRED EMBODIMENT

Figure 1:
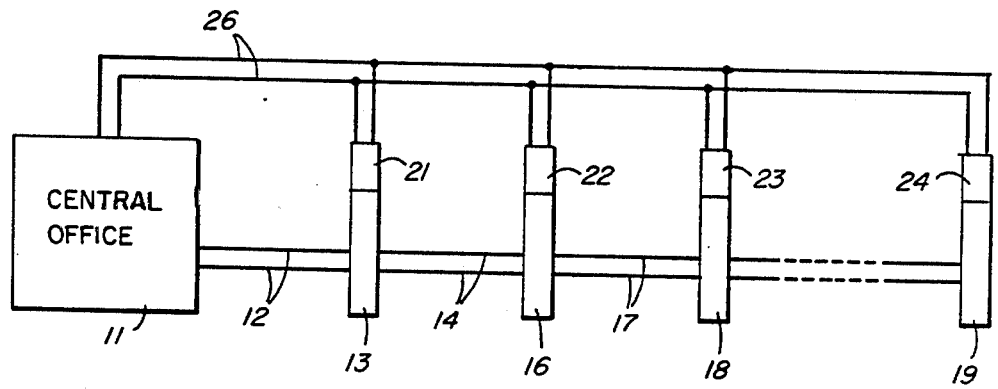
FIG. 1 is a block diagram of an error detection circuit for detecting errors in serially connected repeaters which are serially connected together by electrical cable, such circuitry being part of the prior art.

Referring to FIG. 1, there is depicted a prior art system for locating faults in repeaters. Signals are sent from a central office 11 along a pair of wires 12 to a first repeater 13. The first repeater 13 reforms the received signals before retransmitting them along another pair of wires 14 to a second repeater 16. The second repeater 16 reforms the received signals before retransmitting them along still another pair of wires 17 to a subsequent repeater 18, and so on to the nth repeater 19.

Each repeater 13, 16, 18, 19 has a respective very high Q band pass filter 21, 22, 23, 24 associated therewith, the filters 21 22, 23, 24 having their respective center frequencies coinciding with the respective repeaters.

The respective filters 21, 22, 23, 24 can pass the respective frequencies $f_1$, $f_2$, $f_3$, $f_n$. The outputs of the filters 21, 22, 23, 24 are coupled via a single pair of wires 26 to the central office 11.

In operation, a series of bipolar pulses having a component at a frequency $f_1$ is sent by the central office 11 along the electrical wires 12 to the first repeater 13. If no fault is present at the first repeater 13, a tone at the frequency $f_1$ will be passed by the filter 21 to the wires 26 back to the central office 11. If a fault is present at the first repeater 13, no signal is returned to the central office.

Next, a series of bipolar pulses having a component at a frequency $f_2$ is sent by the central office 11 along the electrical wires 12 to the first repeater 13. If no fault is present at the second repeater 16, a tone at the frequency $f_2$ will be passed by the filter 22 to the wires 26 back to the central office 11. If a fault is present, no signal is returned.

In similar fashion, subsequently, a series of bipolar pulses having a component at a frequency $f_n$ is sent by the central office 11 along the electrical wires 12 to the first repeater 13. If no fault is present at the nth repeater 19, a tone at the frequency $f_n$ will be passed by the filter 24 to the wires 26 back to the central office 11. If a fault is present at the nth repeater 19, no signal is returned to the central office 11.

The sending of bipolar pulses, of course, is not convenient along optical cable.

Various embodiments of this invention are suitable for providing a fault locating system for optical transmission lines.

In one embodiment, low frequency tones are encoded by a delta modulator operating at the T-1 or other carrier bit rate, the tones being decoded at each repeater location. A suitable decoder can include a simple integrator followed by a band pass filter (identical to one employed with the two patterns utilized with the electrical wire cable systems) to distinguish the various tones for each location.

In a second embodiment, a square wave (of the same frequency as the tones) is used to gate a pulse stream operating at the T-1 or other carrier bit rate. The decoder can be the same as the decoder in the first embodiment.

Figure 2:
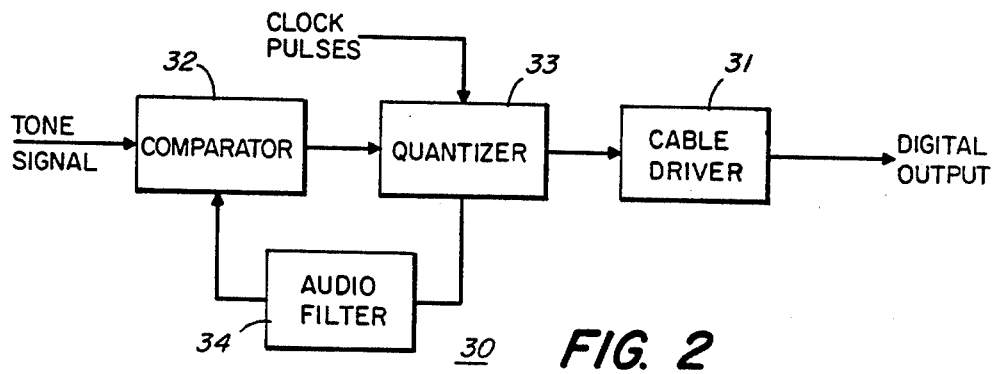
FIG. 2 is a block diagram of a delta modulator coupled to a cable driver, suitable for use in one embodiment of the invention.

FIG. 2 depicts a delta modulator 30 coupled to a cable driver 31. Usually incorporated in the central office 11, the delta modulator 30 receives a tone signal from the central office 11, the tone signal being coupled to one input of the comparator 32. The output of the comparator 32 is coupled to a quantizer 33 which receives clock pulses. One output of the quantizer 33 is coupled through an audio filter 34 to a second input of the comparator 32. A second output of the quantizer 33 is coupled to the input of the cable driver 31.

Thus, audio frequency tones drive a comparator 32 as shown in the delta modulator 30 of FIG. 2. The comparator 32 also receives a dequantized replica of the audio signal from the delta modulator output. The output of the comparator 32 is an error signal $\Sigma$, which represents the difference between the two input signals. The error signal is quantized at the T-1 or other carrier telephone transmission rate by a slicing circuit 33 and subsequently provides the digital output to the optical fiber transmission line.

In general, a delta modulator converts an analog signal into a digital signal for transmission through a telecommunication channel. At a receiver, the digital signal can be reconverted to an analog signal.

The purpose of converting analog signals to digital signals is to obviate the degrading effects of noise and other non-linearities.

The digital signals, by the time they arrive at a repeater, are in distorted form. The repeater reforms the received digital signals before retransmitting them to a subsequent repeater.

Figure 3:
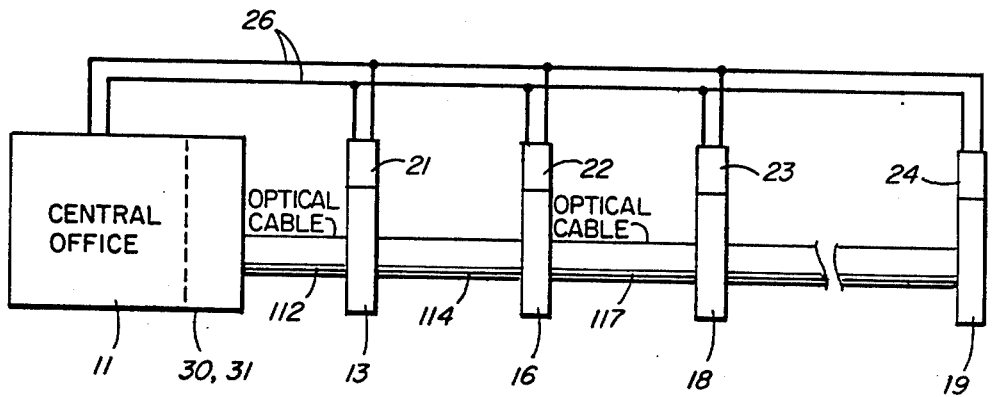
FIG. 3 is a block diagram of a preferred embodiment of this invention, for locating faults in repeaters which are serially coupled together by optical cable.

Referring to FIG. 3, there is shown a fault locating system similar in certain respects to that shown in FIG. 1. In substance, a central office 11 is coupled to a first repeater 13 (having a frequency $f_1$ associated therewith); the first repeater 13 is coupled to a second repeater 16 having a frequency $f_2$ associated therewith. The second repeater 16 is coupled to a third repeater 18 having a frequency $f_3$, and so on; the (n−1)st repeater is coupled to the nth repeater 19 having a frequency $f_n$ associated therewith.

As in the prior art discussed with respect to FIG. 1, filters 21, 22, 23, 24 are associated, respectively, with the repeaters 13, 16, 18, 19, and are each adapted, respectively, to pass a band of frequencies having a center frequency $f_1$, $f_2$, $f_3$, $f_n$, respectively. The outputs of each of the filters 21, 22, 23, 24 are returned to the central office 11 by a pair of wires 26.

A tone signal at the central office 11 was directly coupled to the repeater 13 by way of a cable 12, according to the prior art discussed with respect to FIG. 1, above. In this invention, a tone signal at the central office 11 is delta modulated and driven (as by the delta modulator 30 and cable driver 31 of FIG. 2) as an optical signal along an optical cable 112 to the first repeater 13. The first repeater 13 has an optical cable 114 joining it to the second repeater 16. The second repeater 16 is coupled to the third repeater 18 by an optical cable 117; and so on, to the nth repeater 19.

In practice, the fault locator receives an audio tone into the delta modulator 30 (FIGS. 2 and 3). The frequency of the tone identifies a particular repeater 13, 16, 18, ... 19. The delta modulator 30 output is applied to the cable driver 31. The signal propagates through the optical cable 112 and is received by the identified repeater. If the repeater is operational, a signal is returned to the near end via the metal wire line pair 26 provided for this purpose. Each span line repeater is checked by sending appropriate tones to sequentially test each repeater station, starting at the central office and progressing toward the far end. A faulty repeater station is located when no tone signal is received at the near end.

The foregoing represents a preferred embodiment of the present invention, and it is recognized that many obvious changes and modifications may be made by one skilled in the art. These changes and modifications are within the scope of the invention which is defined in the appended claims.

What is claimed is:

1. In combination,
   a central office;
   means associated with said central office for generating a tone signal;
   analog to digital conversion means for converting said tone signal to a unipolar digital signal;
   cable driving means for receiving said digital signal and for providing an output for driving an optical cable;
   a first optical cable having an input coupled to the output of said cable driving means, and an output;
   a first filter, having an input and an output, for passing signals at a frequency $f_1$;
   a first repeater having an input coupled to the output of said first optical cable for reforming the received digital signal before retransmission thereof, said first repeater being coupled to said input of said first filter;

a secod optical cable having an input coupled to an output of said first repeater, and an output;

a second filter, having an input and an output, for passing signals at a frequency $f_2$;

a second repeater having an input coupled to the output of said second optical cable for reforming the received digital signal before retransmission thereof, said second repeater being coupled to said input of said second filter;

an nth optical cable having an input coupled to an output of the (n−1)st repeater, and an output;

an nth filter, having an input and an output, for passing signals at a frequency $f_n$;

an nth repeater having an input coupled to the output of the nth optical cable for reforming the received digital signal before retransmission thereof, said nth repeater being coupled to said input of said nth filter; and a pair of wires coupling the outputs of said filters to said central office;

wherein n is an integer greater than 2.

2. The combination as recited in claim 1 wherein said analog to digital conversion means includes a delta modulator.

3. The combination as recited in claim 2 wherein said delta modulator includes a comparator having a first input adapted to receive said tone signal, a second input, and an output;

a quantizer having a first input coupled to said comparator output, a second input coupled to receive clock pulses, a first output for providing a digital output therefrom, and a second output, and an audio filter having an input coupled to said quantizer second output, and having an output coupled to said comparator second input.

4. In combination, a central office;

means associated with said central office for generating a square wave for gating a unipolar pulse stream at a carrier bit rate;

cable driving means coupled to said generating means for providing an output for driving an optical cable;

a first optical cable having an input coupled to the output of said cable driving means, and an output;

a first filter, having an input and an output, for passing signals at a frequency $f_1$;

a first repeater having an input coupled to the output of said first optical cable for reforming the received pulse stream before retransmission thereof, said first repeater being coupled to said input of said first filter;

a second optical cable having an input coupled to an output of said first repeater, and an output;

a second filter, having an input and an output for passing signals at a frequency $f_2$;

a second repeater having an input coupled to the output of said second optical cable for reforming the received pulse stream before retransmission thereof, said second repeater being coupled to said input of said second filter;

an nth optical cable having an input coupled to an output of the (n−1)st repeater, and an output;

an nth filter, having an input and an output, for passing signals at a frequency $f_n$;

an nth repeater having an input coupled to the output of the nth optical cable for reforming the received pulse stream before retransmission thereof, said nth repeater being coupled to said input of said nth filter; and a pair of wires coupling the outputs of said filters to said central office, wherein n is an integer greater than 2.

5. A method of locating a fault in one of n repeaters serially connected by optical cables to a central office, each repeater having a different frequency associated therewith, and each repeater having a very high Q band pass filter having the center frequency thereof coinciding with said frequency associated with the respective repeater, comprising, in the order named (1) delta modulating a tone signal, having a frequency $f_1$ corresponding to said frequency associated with said first repeater, at a carrier bit rate at said central office;

(2) converting said delta modulated tone signal to a unipolar light output and driving a first optical cable coupling said central office to said first repeater;

(3) detecting on a single pair of wires which couples the outputs of all of said filters to said central office the presence or absence of said frequency $f_1$;

(4) delta modulating a tone signal, having a frequency $f_2$ corresponding to said frequency associated with said second repeater, at a carrier bit rate at said central office;

(5) converting said delta modulated tone signal to a unipolar light output and driving a second optical cable coupling said first repeater to said second repeater;

(6) detecting on said single pair of wires which couples the outputs of all of said filters to said central office the presence or absence of said frequency $f_2$;

(7) delta modulating a tone signal, having a frequency $f_n$ corresponding to said frequency associated with said nth repeater, at a carrier bit rate at said central office;

(8) converting said delta modulated tone signal to a unipolar light output and driving an nth optical cable coupling the (n−1)st repeater to the nth repeater;

(9) detecting on said single pair of wires which couples the outputs of all of said filters to said central office the presence or absence of said frequency $f_n$;

wherein n is an integer greater than 2; and wherein said method ceases following the detection of an absence of one of said frequencies.

6. The method as recited in claim 5 wherein said method continues through to the nth repeater.

7. A method of locating a fault in one of n repeaters, serially connected by optical cables to a central office, each repeater having a different frequency $f_1, f_2, \ldots f_n$ associated therewith, and each repeater having a very high-Q band-pass filter having the center frequency thereof coinciding with said frequency associated with the respective repeater, comprising, in the order named:

(1) using an audio frequency square wave at the frequency $f_1$ to gate a pulse stream operating at a T-1 bit rate, at said central office;

(2) converting said gated stream into a unipolar light output for driving a first optical cable coupling said central office to the first repeater;

(3) detecting on a single pair of wires that couples the outputs of all of said filters to said central office the presence or absence of said frequency $f_1$;

(4) using an audio frequency square wave at the frequency $f_2$ to gate a pulse stream operating at said carrier bit rate at said central office;

(5) converting said gated stream into a unipolar light output for driving a second optical cable coupling said first repeater to the second repeater;

(6) detecting on said single pair of wires that couples the outputs of all of said filters to said central office, the presence or absence of said frequency $f_2$;

(7) using an audio frequency square wave having a frequency $f_n$ to gate a pulse stream operating at said carrier bit rate, at said central office; and (8) converting said gated stream into unipolar light output for driving an nth optical cable from said nth repeater, and so on, wherein n is an integer greater than 2, and wherein the method ceases following the detection of an absence of one of said frequencies.

8. Apparatus for locating, from a test location, faults in an optical communications system, said apparatus comprising:

means associated with said test location for generating a tone signal;

analog to digital conversion means for converting said tone signal to a unipolar digital signal;

cable driving means for receiving said digital signal and for providing an output for driving an optical cable;

a first optical cable having an input coupled to the output of said cable driving means, and an output;

a first filter, having an input and an output, for passing signals at a frequency $f_1$;

a first repeater having an input coupled to the output of said first optical cable for reforming the received digital signal before retransmission thereof, said first repeater being coupled to said input of said first filter;

a second optical cable having an input coupled to an output of said first repeater, and an output;

a second filter, having an input and an output, for passing signals at a frequency $f_2$;

a second repeater having an input coupled to the output of said second optical cable for reforming the received digital signal before retransmission thereof, said second repeater being coupled to said input of said second filter;

an nth optical cable having an input coupled to an output of the (n−1)st repeater, and an output;

an nth filter, having an input and an output, for passing signals at a frequency $f_n$;

an nth repeater having an input coupled to the output of the nth optical cable for reforming the received digital signal before retransmission thereof, said nth repeater being coupled to said input of said nth filter; and a pair of wires coupling the outputs of said filters to said test location;

wherein n is an integer greater than 2.

9. The apparatus as recited in claim 8 wherein said analog to digital conversion means includes a delta modulator.

10. The apparatus as recited in claim 9 wherein said delta modulator includes a comparator having a first input adapted to receive said tone signal, a second input, and an output;

a quantizer having a first input coupled to said comparator output, a second input coupled to receive clock pulses, a first output for providing a digital output therefrom, and a second output, and an audio filter having an input coupled to said quantizer second output, and having an output coupled to said comparator second input.

11. Apparatus for locating, from a test location, faults in an optical communications system, said apparatus comprising:

means associated with said test location for generating a square wave for gating a unipolar pulse stream at a carrier bit rate;

cable driving means coupled to said generating means for providing an output for driving an optical cable;

a first optical cable having an input coupled to the output of said cable driving means, and an output;

a first filter, having an input and an output, for passing signals at a frequency $f_1$;

a first repeater having an input coupled to the output of said first optical cable for reforming the received pulse stream before retransmission thereof, said first repeater being coupled to said input of said first filter;

a second optical cable having an input coupled to an output of said first repeater, and an output;

a second filter, having an input and an output for passing signals at a frequency $f_2$;

a second repeater having an input coupled to the output of said second optical cable for reforming the received pulse stream before retransmission thereof, said second repeater being coupled to said input of said second filter;

an nth optical cable having an input coupled to an output of the (n−1)st repeater, and an output;

an nth filter, having an input and an output, for passing signals at a frequency $f_n$;

an nth repeater having an input coupled to the output of the nth optical cable for reforming the receiving pulse stream before retransmission thereof, said nth repeater being coupled to said input of said nth filter; and a pair of wires coupling the outputs of said filters to said test location, wherein n is an integer greater than 2.

* * * * *